United States Patent [19]
Weder

[11] Patent Number: 5,865,011
[45] Date of Patent: *Feb. 2, 1999

[54] ACCORDION-TYPE PLANT COVER WITH ATTACHED SKIRT AND METHODS

[75] Inventor: Donald E. Weder, Highland, Ill.

[73] Assignee: Southpac Trust International, Inc.

[*] Notice: The term of this patent shall not extend beyond the expiration date of Pat. No. 5,581,938.

[21] Appl. No.: 458,073

[22] Filed: Jun. 1, 1995

Related U.S. Application Data

[63] Continuation of Ser. No. 242,477, May 13, 1994, which is a continuation-in-part of Ser. No. 237,098, May 3, 1994, Pat. No. 5,493,614, which is a continuation-in-part of Ser. No. 220,852, Mar. 31, 1994, Pat. No. 5,572,851, which is a continuation-in-part of Ser. No. 1,001, Jan. 6, 1993, Pat. No. 5,307,606, which is a continuation-in-part of Ser. No. 865,563, May 21, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 220,852, which is a continuation-in-part of Ser. No. 926,098, Aug. 5, 1992, Pat. No. 5,809,629, which is a continuation-in-part of Ser. No. 803,318, Dec. 4, 1991, Pat. No. 5,344,016, which is a continuation-in-part of Ser. No. 707,417, May 28, 1991, abandoned ,which is a continuation of Ser. No. 502,358, Mar. 29, 1990, abandoned ,which is a continuation-in-part of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 926,098, which is a continuation-in-part of Ser. No. 687,701, Apr. 18, 1991, abandoned ,which is a continuation-in-part of Ser. No. 649,263, Jan. 30, 1991, abandoned ,which is a continuation of Ser. No. 248,960, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 220,852, which is a continuation-in-part of Ser. No. 940,930, Sep. 4, 1992, Pat. No. 5,361,482, which is a continuation-in-part of Ser. No. 926,098, Aug. 5, 1992, Pat. No. 5,809,629, which is a continuation-in-part of Ser. No. 803,318, Dec. 4, 1991, Pat. No. 5,344,016, which is a continuation-in-part of Ser. No. 707,417, May 28, 1991, abandoned ,which is a continuation of Ser. No. 502,358, Mar. 29, 1990, abandoned ,which is a continuation-in-part of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 220,852, which is a continuation-in-part of Ser. No. 95,331, Jul. 21, 1993, Pat. No. 5,428,939, which is a continuation-in-part of Ser. No. 963,882, Oct. 20, 1992, Pat. No. 5,408,803, which is a continuation-in-part of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 963,882, which is a continuation-in-part of Ser. No. 893,586, Jun. 2, 1992, Pat. No. 5,181,364, which is a continuation of Ser. No. 707,417, May 28, 1991, abandoned ,which is a continuation of Ser. No. 502,358, Mar. 29, 1990, abandoned ,which is a continuation-in-part of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 95,331, which is a continuation-in-part of Ser. No. 923,117, Jul. 30, 1992, Pat. No. 5,307,605, which is a continuation-in-part of Ser. No. 803,318, Dec. 4, 1991, Pat. No. 5,344,016 ,Ser. No. 95,331, which is a continuation-in-part of Ser. No. 940,930, Sep. 4, 1992, Pat. No. 5,361,482, which is a continuation-in-part of Ser. No. 926,098, Aug. 5, 1992, which is a continuation-in-part of Ser. No. 803,318, Dec. 4, 1991, Pat. No. 5,344,016, which is a continuation-in-part of Ser. No. 707,417, May 28, 1991, abandoned ,which is a continuation of Ser. No. 502,358, Mar. 29, 1990, abandoned ,which is a continuation-in-part of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 237,098, which is a continuation-in-part of Ser. No. 940,930, Sep. 4, 1992, Pat. No. 5,361,482, which is a continuation-in-part of Ser. No. 926,098, Aug. 5, 1992, which is a continuation-in-part of Ser. No. 803,318, Dec. 4, 1991, Pat. No. 5,344,016, which is a continuation-in-part of Ser. No. 707,417, May 28, 1991, abandoned ,which is a continuation of Ser. No. 502,358, Mar. 29, 1990, abandoned ,which is a continuation-in-part of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No.

4,773,182, which is a continuation of Ser. No. 613,080, May 22, 1984, abandoned ,Ser. No. 242,477, which is a continuation-in-part of Ser. No. 940,930, Sep. 4, 1992, Pat. No. 5,361,482, which is a continuation-in-part of Ser. No. 926, 098, Aug. 5, 1992, which is a continuation-in-part of Ser. No. 803,318, Dec. 4, 1991, Pat. No. 5,344,016, which is a continuation-in-part of Ser. No. 707,417, May 28, 1991, abandoned ,which is a continuation of Ser. No. 502,358, Mar. 29, 1990, abandoned ,which is a continuation-in-part of Ser. No. 249,761, Sep. 26, 1988, abandoned ,which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned ,Ser. No. 242,477, which is a continuation-in-part of Ser. No. 108,093, Aug. 17, 1993, Pat. No. 5,472,752, which is a continuation of Ser. No. 24,573, Mar. 1, 1993, abandoned ,which is a continuation of Ser. No. 464,694, Jan. 16, 1990, Pat. No. 5,208,027, which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.⁶ .................................................. B65B 11/00
[52] U.S. Cl. ............................................................ 53/397
[58] Field of Search ........................... 53/397, 399, 580, 53/582, 585; 47/72

[56] References Cited

U.S. PATENT DOCUMENTS

| | | | |
|---|---|---|---|
| D. 254,659 | 4/1980 | Karotseris | D11/143 |
| D. 335,105 | 4/1993 | Ottenwalder et al. | D11/164 |
| 524,219 | 8/1894 | Schmidt . | |
| 557,526 | 3/1896 | Egge . | |
| 732,889 | 7/1903 | Paver . | |
| 920,313 | 5/1909 | Franklin . | |
| 950,785 | 3/1910 | Pene . | |
| 1,063,154 | 5/1913 | Bergen . | |
| 1,069,675 | 8/1913 | Claussen . | |
| 1,446,563 | 2/1923 | Hughes . | |
| 1,525,015 | 2/1925 | Weeks . | |
| 1,610,652 | 12/1926 | Bouchard | 47/72 X |
| 1,697,751 | 1/1929 | Blake . | |
| 1,863,216 | 6/1932 | Wordingham . | |
| 1,868,853 | 7/1932 | Sievers . | |
| 1,978,631 | 10/1934 | Herrlinger . | |
| 2,048,123 | 7/1936 | Howard | 229/87 |
| 2,110,612 | 3/1938 | Skinner et al. | 229/14 |
| 2,170,147 | 8/1939 | Lane | 206/56 |
| 2,204,664 | 6/1940 | Clark | 18/56 |
| 2,218,292 | 10/1940 | Muller | 53/580 |
| 2,239,398 | 4/1941 | Palmer | 229/14 |
| 2,260,230 | 10/1941 | Olson | 206/44 |
| 2,278,673 | 4/1942 | Savada et al. | 154/43 |
| 2,302,259 | 11/1942 | Rothfuss | 41/10 |
| 2,355,559 | 8/1944 | Renner | 229/8 |
| 2,367,749 | 1/1945 | Barbieri | 93/60 |
| 2,371,985 | 3/1945 | Freiberg | 206/46 |
| 2,411,328 | 11/1946 | MacNab | 33/12 |
| 2,458,246 | 1/1949 | Brereton | 220/84 |
| 2,482,981 | 9/1949 | Kamrass | 41/13 |
| 2,510,120 | 6/1950 | Leander | 117/122 |
| 2,529,060 | 11/1950 | Trillich | 117/68.5 |
| 2,544,075 | 3/1951 | Ernst et al. | 150/49 |
| 2,573,770 | 11/1951 | Meadow | 150/28 |
| 2,621,142 | 12/1952 | Wetherell | 154/117 |
| 2,622,380 | 12/1952 | Snyder | 53/15 |
| 2,648,487 | 8/1953 | Linda | 229/55 |
| 2,774,187 | 12/1956 | Smithers | 47/41 |
| 2,780,401 | 2/1957 | Stevens | 229/2.5 |
| 2,822,287 | 2/1958 | Avery | 117/14 |
| 2,822,651 | 2/1958 | Mayer | 53/580 X |
| 2,827,217 | 3/1958 | Clement | 47/72 X |
| 2,845,735 | 8/1958 | Werner | 41/10 |
| 2,846,060 | 8/1958 | Yount | 206/58 |
| 2,883,262 | 4/1959 | Borin | 21/56 |
| 2,967,652 | 1/1961 | Canfield et al. | 229/5.5 |
| 2,989,828 | 6/1961 | Warp | 53/390 |
| 3,013,689 | 12/1961 | Shropshire | 215/100 |
| 3,022,605 | 2/1962 | Reynolds | 47/58 |
| 3,113,712 | 12/1963 | Kindseth | 229/14 |
| 3,121,647 | 2/1964 | Harris et al. | 118/202 |
| 3,130,113 | 4/1964 | Silman | 161/97 |
| 3,148,799 | 9/1964 | Meroney | 220/63 |
| 3,189,502 | 6/1965 | Little | 156/210 |
| 3,318,748 | 5/1967 | Hurst | 156/224 |
| 3,376,666 | 4/1968 | Leonard | 47/41 |
| 3,431,706 | 3/1969 | Stuck | 53/390 |
| 3,436,007 | 4/1969 | Rausing | 229/14 |
| 3,466,214 | 9/1969 | Polk et al. | 156/213 |
| 3,488,022 | 1/1970 | Vittori | 248/152 |
| 3,508,372 | 4/1970 | Wallerstein et al. | 53/3 |
| 3,542,616 | 11/1970 | Cain et al. | 156/224 |
| 3,552,059 | 1/1971 | Moore | 47/41 |
| 3,556,389 | 1/1971 | Gregoire | 229/53 |
| 3,557,516 | 1/1971 | Brandt | 53/14 |
| 3,620,366 | 11/1971 | Parkinson | 206/59 C |
| 3,681,105 | 8/1972 | Milutin et al. | 117/15 |
| 3,757,990 | 9/1973 | Buth | 220/63 R |
| 3,775,932 | 12/1973 | Jeney | 53/22 |
| 3,791,902 | 2/1974 | Hanke et al. | 156/212 |
| 3,793,799 | 2/1974 | Howe et al. | 53/32 |
| 3,869,828 | 3/1975 | Matsumoto | 47/34 |
| 3,927,821 | 12/1975 | Dunning | 229/14 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,118,890 | 10/1978 | Shore | 47/28 |
| 4,170,618 | 10/1979 | Adams | 264/101 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,300,312 | 11/1981 | Weder et al. | 47/72 |
| 4,333,267 | 6/1982 | Witte | 47/84 |
| 4,379,101 | 4/1983 | Smith | 264/40.3 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45 |
| 4,508,223 | 4/1985 | Catrambone | 206/423 |
| 4,546,875 | 10/1985 | Zweber | 206/0.82 |
| 4,640,079 | 2/1987 | Stuck | 53/390 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,105,599 | 4/1992 | Weder | 53/399 |
| 5,111,638 | 5/1992 | Weder | 53/397 |
| 5,117,584 | 6/1992 | Ottenwalder | 47/72 |
| 5,120,382 | 6/1992 | Weder | 156/212 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,235,782 | 8/1993 | Landau | 47/72 |
| 5,259,106 | 11/1993 | Weder et al. | 29/469 |
| 5,581,938 | 12/1996 | Weder | 47/72 |
| 5,592,776 | 1/1997 | Weder | 47/72 |
| 5,595,022 | 1/1997 | Weder | 47/72 |

| | | |
|---|---|---|
| 5,595,023 | 1/1997 | Weder .......................................... 47/72 |

FOREIGN PATENT DOCUMENTS

| | | |
|---|---|---|
| 1393725 | 2/1965 | France . |
| 2137325 | 12/1972 | France . |
| 2467796 | 4/1981 | France . |
| 2489126 | 3/1982 | France . |
| 2610604 | 8/1988 | France . |
| 2619698 | 3/1989 | France . |
| 1376047 | 9/1994 | France . |
| 513971 | 11/1930 | Germany . |
| 542958 | 2/1993 | Japan . |
| 560532 | 4/1975 | Switzerland . |
| 1096058 | 12/1967 | United Kingdom . |
| 9003311 | 4/1990 | WIPO . |

OTHER PUBLICATIONS

Exhibit A—Speed Cover Brochure, "The Simple Solution For Those Peak Volume Periods", Highland Supply Corporation, ©1989.

Exhibit B—"Speed Sheets and Speed Rolls" Brochure, Highland Supply Corporation, ©1990.

Exhibit C—"Color Them Happy with Highlander Products" ©1992.

Exhibit D—"Halloween", Link Magazine, Sep. 1992.

Exhibit E—"Super Seller", Supermarket Floral, Sep. 15, 1992.

Exhibit F—"Costa Keeps the Christmas Spirit", Supermarket Floral, Sep. 15, 1992.

Exhibit G—"Now More Than Ever", Supermarket Floral, Sep. 15, 1992.

Exhibit H—Chantler & Chantler brochure showing Zipper Sleeve and Florasheet®, Date Unknown.

Exhibit I—"A World of Cut Flower and Pot Plant Packaging" Brochure, Klerk's Plastic Products Manufacturing, Inc., Date Unknown.

*Primary Examiner*—Linda Johnson
*Attorney, Agent, or Firm*—Dunlap & Codding, P.C.

[57]  ABSTRACT

A plant cover, comprising a base formed from a sheet of material, said base having an upper end, a lower end, and an outer peripheral surface, an opening intersecting the upper end forming an inner peripheral surface and a retaining space, a skirt formed from a sheet of material, said skirt connected to the upper end of the base, and expansion means formed integrally with the base, the expansion means comprising an excess of material, the expansion means permitting the base to expand and contract to both closely encompass and follow the contours of a pot. Methods of using a plant cover.

8 Claims, 5 Drawing Sheets

5,865,011

ACCORDION-TYPE PLANT COVER WITH ATTACHED SKIRT AND METHODS

This application is a continuation of U.S. Ser. No. 08/242,477, filed May 13, 1994, entitled "ACCORDION-TYPE PLANT COVER WITH ATTACHED SKIRT AND METHODS"; which is a continuation-in-part of U.S. Ser. No. 08/237,098, filed May 3, 1994, entitled "SLEEVE HAVING A DETACHABLE PORTION FORMING A SKIRT AND METHODS," now U.S. Pat. No. 5,493,614; which is a continuation-in-part of U.S. Ser. No. 08/220,852, filed Mar. 31, 1994, entitled "PLANT PACKAGE HAVING A DETACHABLE SLEEVE AND METHODS," now U.S. Pat. No. 5,572,851; which is a continuation-in-part of U.S. Ser. No. 08/001,001, filed Jan. 6, 1993, entitled "COVERING FOR FLOWER POT AND FLORAL GROUPING," now U.S. Pat. No. 5,307,606; which is a continuation-in-part of U.S. Ser. No. 07/865,563, filed May 21, 1992, entitled "METHODS FOR WRAPPING A FLORAL GROUPING," now U.S. Pat. No. 5,245,814; which is a continuation of U.S. Ser. No. 07/649,379, filed Jan. 31, 1991, entitled "METHOD FOR WRAPPING AN OBJECT WITH A MATERIAL HAVING PRESSURE SENSITIVE ADHESIVE THEREON," now U.S. Pat. No. 5,111,638; which is a continuation of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 07/249,083, filed Jul. 13, 1988, entitled "ARTICLE FORMING SYSTEM," now U.S. Pat. No. 4,897,031; which is a continuation of U.S. Ser. No. 07/004,275, filed Jan. 5, 1987, entitled "ARTICLE FORMING SYSTEM," now U.S. Pat. No. 4,773,182; which is a continuation of U.S. Ser. No. 06/613,080, filed May 22, 1984, entitled "ARTICLE FORMING SYSTEM," now abandoned.

Said application Ser. No. 08/220,852 is also a continuation-in-part of U.S. Ser. No. 07/926,098, filed Aug. 5, 1992, entitled "METHOD AND APPARATUS FOR FORMING A DECORATIVE COVER," now U.S. Pat. No. 5,809,629; which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD," now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO," now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO," now abandoned; which is a continuation-in-part of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 07/219,083, filed Jul. 13, 1988, entitled "ARTICLE FORMING SYSTEM," now U.S. Pat. No. 4,897,031; which is a continuation of U.S. Ser. No. 07/004,275, filed Jan. 5, 1987, entitled "ARTICLE FORMING SYSTEM," now U.S. Pat. No. 4,773,182; which is a continuation of U.S. Ser. No. 06/613,080, filed May 22, 1984, entitled "ARTICLE FORMING SYSTEM," now abandoned.

Said application Ser. No. 07/926,098 is also a continuation-in-part of U.S. Ser. No. 07/687,701, filed Apr. 18, 1991, entitled "WRAPPING MATERIAL HAVING A SHAPE SUSTAINING ELEMENT AND METHOD," now abandoned; which is a continuation-in-part of U.S. Ser. No. 07/649,263, filed Jan. 30, 1991, entitled "FLEXIBLE VASE," now abandoned; which is a continuation of U.S. Ser. No. 07/248,960, filed Sep. 26, 1988, entitled "FLEXIBLE VASE," now abandoned; which is a continuation-in-part of U.S. Ser. No 07/219,083, filed Jul. 13, 1988, entitled "ARTICLE FORMING SYSTEM," now U.S. Pat. No. 4,897,031; which is a continuation of U.S. Ser. No. 07/004,275, filed Jan. 5, 1987, entitled "ARTICLE FORMING SYSTEM," now U.S. Pat. No. 4,773,182; which is a continuation of U.S. Ser. No. 06/613,080, filed May 22, 1984, entitled "ARTICLE FORMING SYSTEM," now abandoned.

Said application Ser. No. 08/220,852 is also a continuation-in-part of U.S. Ser. No. 07/940,930, filed Sep. 4, 1992, entitled "A METHOD OF FORMING A FLOWER POT COVER WITH CRIMPED PORTION," now U.S. Pat. No. 5,361,482; which is a continuation-in-part of U.S. Ser. No. 07/926,098, filed Aug. 5, 1992, entitled "METHOD AND APPARATUS FOR FORMING A DECORATIVE COVER," now U.S. Pat. No. 5,809,629, which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD," now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO," now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO," now abandoned; which is a continuation-in-part of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 07/219,083, filed Jul. 13, 1988, entitled "ARTICLE FORMING SYSTEM," now U.S. Pat. No. 4,897,031; which is a continuation of U.S. Ser. No. 07/004,275, filed Jan. 5, 1987, entitled "ARTICLE FORMING SYSTEM," now U.S. Pat. No. 4,773,182; which is a continuation of U.S. Ser. No. 06/613,080, filed May 22, 1984, entitled "ARTICLE FORMING SYSTEM," now abandoned.

Said application Ser. No. 08/220,852 is also a continuation-in-part of U.S. Ser. No. 08/095,331, filed Jul. 21, 1993, entitled "METHOD FOR CRIMPING A WRAPPER ABOUT A FLORAL GROUPING," now U.S. Pat. No. 5,428,939; which is a continuation-in-part of U.S. Ser. No. 07/963,882, filed Oct. 20, 1992, entitled "WRAPPING MATERIAL HAVING A PULL TAB AND PULL INDICIA FOR WRAPPING A FLORAL ARRANGEMENT AND METHOD," now U.S. Pat. No. 5,408,803; which is a continuation-in-part of U.S. Ser. No. 07/865,563, filed Apr. 9, 1992, entitled "METHOD FOR WRAPPING A FLORAL GROUPING," now U.S. Pat. No. 5,245,814; which is a continuation of U.S. Ser. No. 07/649,379, filed Jan. 31, 1991, entitled "METHOD FOR WRAPPING AN OBJECT WITH A MATERIAL HAVING PRESSURE SENSITIVE ADHESIVE THEREON," now U.S. Pat. No. 5,111,638; which is a continuation of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 219,083, filed Jul. 13, 1988, entitled "ARTICLE FORMING SYSTEM," now U.S. Pat. No. 4,897,031; which is a continuation of U.S. Ser. No. 004,275, filed Jan. 5, 1987, entitled "ARTICLE FORMING SYSTEM," now U.S. Pat. No. 4,773,182; which is a continuation of U.S. Ser. No. 613,080, filed May 22, 1984, entitled "ARTICLE FORMING SYSTEM," now abandoned.

Said application Ser. No. 07/963,882 is also a continuation-in-part of U.S. Ser. No. 07/893,586 filed Jun. 2, 1992, entitled "WRAPPING A FLORAL GROUPING WITH SHEETS HAVING ADHESIVE OR COHESIVE MATERIAL APPLIED THERETO," now U.S. Pat. No. 5,181,364; which is a continuation of U.S. Ser. No. 07/707, 417 filed May 28, 1991, entitled "WRAPPING A FLORAL GROUPING WITH SHEETS HAVING ADHESIVE OR COHESIVE MATERIAL APPLIED THERETO," now abandoned; which is a continuation of U.S. Ser. No. 07/502, 358, filed Mar. 29, 1990, entitled "WRAPPING A FLORAL GROUPING WITH SHEETS HAVING ADHESIVE OR COHESIVE MATERIAL APPLIED THERETO," now abandoned; which is a continuation-in-part of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 219,083, filed Jul. 13, 1988, entitled "ARTICLE FORMING SYSTEM," now U.S. Pat. No. 4,897,031; which is a continuation of U.S. Ser. No. 004,275, filed Jan. 5, 1987, entitled "ARTICLE FORMING SYSTEM," now U.S. Pat. No. 4,773,182; which is a continuation of U.S. Ser. No. 613,080, filed May 22, 1984, entitled "ARTICLE FORMING SYSTEM," now abandoned.

Said application Ser. No. 08/095,331 is also a continuation-in-part of U.S. Ser. No. 07/923,117 filed Jul. 30, 1992, entitled "METHOD AND APPARATUS FOR PROVIDING A WRAPPER FOR A FLORAL GROUPING HAVING A FLAP FOR CLOSING THE UPPER END OR THE LOWER END OF THE WRAPPER," now U.S. Pat. No. 5,307,605; which is a continuation-in-part of U.S. Ser. No. 07/803,318 filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD," now U.S. Pat. No. 5,344,016.

Said application Ser. No. 08/095,331 is also a continuation-in-part of U.S. Ser. No. 07/940,930 filed Sep. 4, 1992, entitled "A METHOD OF FORMING A FLOWER POT COVER WITH CRIMPED PORTION," now U.S. Pat. No. 5,361,482; which is a continuation-in-part of U.S. Ser. No. 07/926,098 filed Aug. 5, 1992, entitled "METHOD AND APPARATUS FOR FORMING A DECORATIVE COVER;" which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD," now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO," now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO," now abandoned; which is a continuation-in-part of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 219,083, filed Jul. 13, 1988, entitled "ARTICLE FORMING SYSTEM," now U.S. Pat. No. 4,897,031; which is a continuation of U.S. Ser. No. 004,275, filed Jan. 5, 1987, entitled "ARTICLE FORMING SYSTEM," now U.S. Pat. No. 4,773,182; which is a continuation of U.S. Ser. No. 613,080, filed May 22, 1984, entitled "ARTICLE FORMING SYSTEM," now abandoned.

Said application Ser. No. 08/237,098, filed May 3, 1994, entitled "SLEEVE HAVING A DETACHABLE PORTION FORMING A SKIRT AND METHODS", now U.S. Pat. No. 5,625,979 is also a continuation-in-part of U.S. Ser. No. 07/940,930, filed Sep. 4, 1992, entitled "A METHOD OF FORMING A FLOWER POT COVER WITH CRIMPED PORTION," now U.S. Pat. No. 5,361,482; which is a continuation-in-part of U.S. Ser. No. 07/926,098, filed Aug. 5, 1992, entitled "METHOD AND APPARATUS FOR FORMING A DECORATIVE COVER;" which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD," now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO," now abandoned; which is a continuation of U.S. Ser. No. 07/502, 358, filed Mar. 29, 1990, entitled "WRAPPING A FLORAL GROUPING WITH SHEETS HAVING ADHESIVE OR COHESIVE MATERIAL APPLIED THERETO," now abandoned; which is a continuation-in-part of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 219,083, filed Jul. 13, 1988, entitled "ARTICLE FORMING SYSTEM," now U.S. Pat. No. 4,897,031; which is a continuation of U.S. Ser. No. 004,275, filed Jan. 5, 1987, entitled "ARTICLE FORMING SYSTEM," now U.S. Pat. No. 4,773,182; which is a continuation of U.S. Ser. No. 613,080, filed May 22, 1984, entitled "ARTICLE FORMING SYSTEM," now abandoned.

Said application Ser. No. 08/242,477, is also a continuation-in-part of U.S. Ser. No. 07/940,930, filed Sep. 4, 1992, entitled "A METHOD OF FORMING A FLOWER POT COVER WITH CRIMPED PORTION," now U.S. Pat. No. 5,361,482; which is a continuation-in-part of U.S. Ser. No. 07/926,098, filed Aug. 5, 1992, entitled "METHOD AND APPARATUS FOR FORMING A DECORATIVE COVER;" which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE MATERIAL APPLIED THERETO AND METHOD," now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO," now abandoned; which is a continuation of U.S. Ser. No. 07/502,358, filed Mar. 29, 1990, entitled "WRAPPING A FLORAL GROUPING WITH SHEETS HAVING ADHESIVE OR COHESIVE MATERIAL APPLIED THERETO," now abandoned; which is a continuation-in-part of U.S. Ser. No. 249,761, filed Sep. 26, 1988, entitled "METHOD FOR WRAPPING AN OBJECT WITH A MATERIAL HAVING PRESSURE SENSITIVE ADHESIVE THEREON," now abandoned; which is a continuation-in-part of U.S. Ser. No. 219,083, filed Jul. 13, 1988, entitled "ARTICLE FORMING SYSTEM," now U.S. Pat. No. 4,897,031; which is a continuation of U.S. Ser. No. 004,275, filed Jan. 5, 1987, entitled "ARTICLE FORMING SYSTEM," now U.S. Pat. No. 4,773,182; which is a continuation of U.S. Ser. No. 613,080, filed May 22, 1984, entitled "ARTICLE FORMING SYSTEM," now abandoned.

Said application Ser. No. 08/242,477 is also a continuation-in-part of U.S. Ser. No. 08/108,093, filed Aug. 17, 1993, entitled "ARTICLE FORMING SYSTEM," now U.S. Pat. No. 5,472,752; which is a continuation of U.S. Ser. No. 08/024,573, filed Mar. 1, 1993, entitled "ARTICLE FORMING SYSTEM," now abandoned; which is a continuation of U.S. Ser. No. 07/464,694, filed Jan. 16, 1990, entitled "ARTICLE FORMING SYSTEM," now U.S. Pat. No. 5,208,027; which is a continuation of U.S. Ser. No. 219,083, filed Jul. 13, 1988, entitled "ARTICLE FORMING SYSTEM," now U.S. Pat. No. 4,897,031; which is a continuation of U.S. Ser. No. 004,275, filed Jan. 5, 1987, entitled "ARTICLE FORMING SYSTEM," now U.S. Pat. No. 4,773,182; which is a continuation of U.S. Ser. No. 613,080, filed May 22, 1984, entitled "ARTICLE FORMING SYSTEM," now abandoned.

FIELD OF THE INVENTION

This invention generally relates to decorative covers, and, more particularly, to decorative plant covers used to cover flower pots containing floral groupings and/or mediums containing floral groupings, and methods of using same.

DESCRIPTION OF THE PREFERRED EMBODIMENTS

The present invention contemplates a plant cover having a base and a skirt for packaging a potted plant. The base and skirt combination may comprise a unitary construction or may comprise separate components which are attached together by various bonding materials.

More specifically, the present invention contemplates a plant cover for covering a pot means having an outer peripheral surface. The plant cover comprises (1) a base portion having a lower end, an upper end, an outer peripheral surface, and an area of excess material for allowing expansion of at least a portion of the base portion and having an opening extending from the upper end to the lower end, and also comprises (2) a skirt which extends angularly from the upper end of the base portion. In general, the base portion is sized to substantially cover the outer peripheral surface of the pot means.

The Embodiments and Methods of Use of FIGS. 1–5

Shown in FIGS. 1–5 and designated therein by the general reference numeral 10 is a flexible plant cover of unitary construction. The plant cover 10 initially comprises a flexible flat collapsed piece of material (FIG. 12) which is openable in the form of a tube (FIG. 13), the plant cover 10 also having a skirt formed integrally therewith (FIGS. 1–5). Alternatively, the plant cover 10 may comprise separate components (FIGS. 12–20), namely, at least a base 12 which forms the tube and a skirt 14 which is connected via bonding material to the base 12, and which extends outwardly therefrom. Each plant cover 10 also has a plurality of expansion elements 15.

The plant cover 10 may be tapered outwardly from the lower end toward a larger diameter at its upper end. In its flattened state the plant cover 10 has an overall rectangular, modified rectangular, trapezoidal or modified trapezoidal shape, and when opened is substantially frusto-conical or cylindrical. It will be understood, however, that the plant cover 10 may comprise variations on the aforementioned shapes or may comprise significantly altered shapes such as square. It will be appreciated that the plant cover 10 may comprise any shape or form, however, as long as the plant cover 10 functions in accordance with the present invention in the manner described herein.

Figures 1, 2, 3, 4:
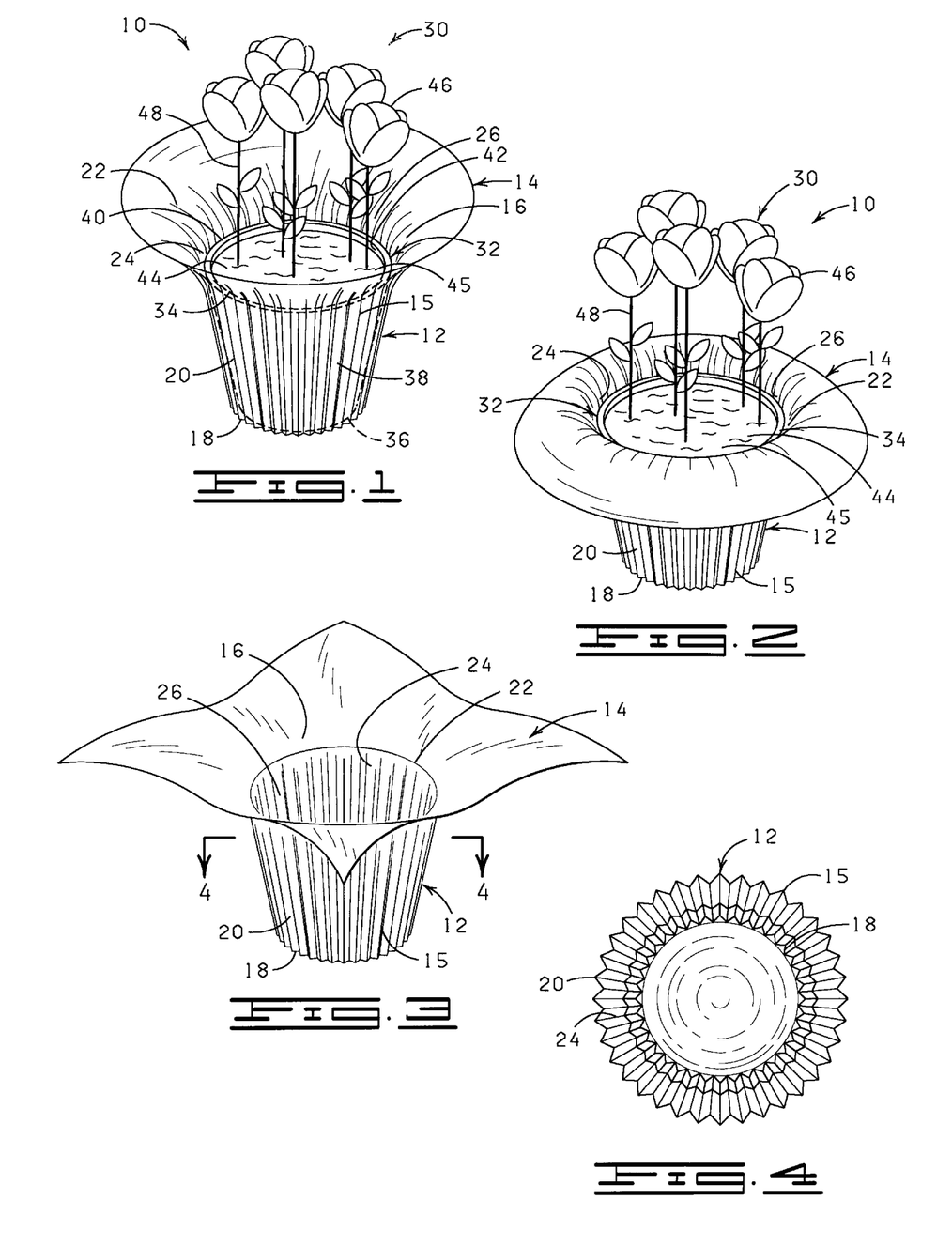
FIG. 1 is a perspective view of a version of the invention wherein the plant cover comprises a plurality of accordion-shaped expansion elements for enhancing the expansion of the base and the extension of the skirt, the plant cover being of unitary construction.
FIG. 2 is a perspective view of the plant cover of FIG. 1 but showing a differing angle of the skirt.
FIG. 3 is a perspective view of a plant cover similar to the plant cover of FIG. 1 except that the skirt is a square skirt.
FIG. 4 is a plan view of a cross section through the plant cover of FIG. 3, showing a bottom formed in the plant cover, the bottom being formed from a round sheet of material which at least partially follows the accordion-shaped contours of the plurality of expansion elements.
Figures 5, 6, 7, 8:
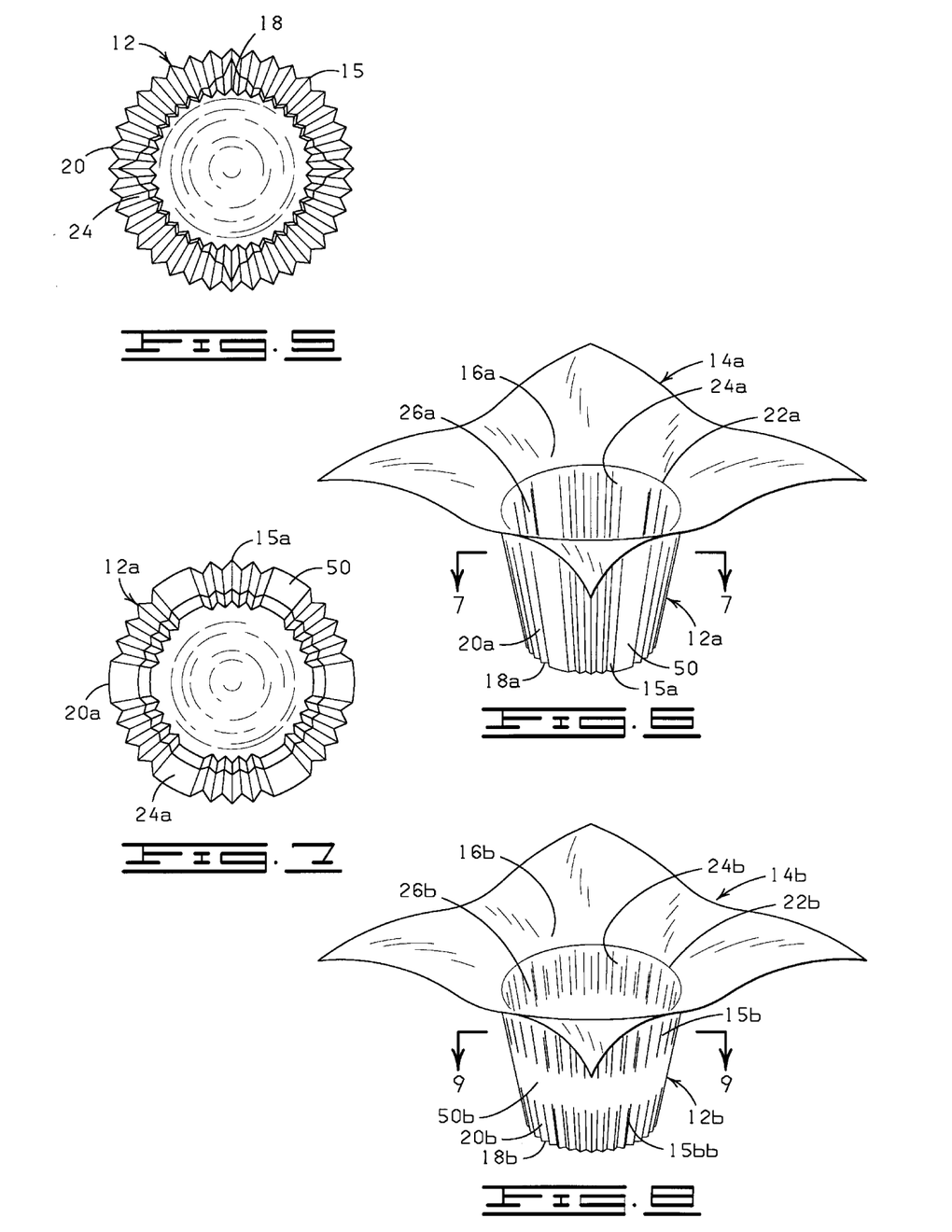
FIG. 5 is a plan view of a cross section through the plant cover of FIG. 3, but showing an alternative bottom formed in the plant cover, the bottom being formed from a square sheet of material which at least partially follows the accordion-shaped contours of the plurality of expansion elements.
FIG. 6 is a perspective view of a plant cover similar to the plant cover shown in FIG. 3, but having expansion element strips alternating with smooth strips in a vertical orientation which extends circumferentially about the base of the plant cover.
FIG. 7 is a plan view of a cross section through the plant cover of FIG. 6 showing the expansion element strips alternating with the smooth strips about the base of the plant cover.
FIG. 8 is a perspective view of a plant cover similar to the plant cover shown in FIG. 3, but having expansion element strips alternating with smooth strips in a horizontal orientation which extends circumferentially about the base of the plant cover.

The base 12 of the plant cover 10 has an upper end 16, a lower end 18, and an outer peripheral surface 20. The base 12 of the plant cover 10 has an opening 22 which intersects the upper end 16 and may also intersect at the lower end 18 as well, or the lower end 18 may remain closed with a bottom at the lower end 18 (FIGS. 4 and 5). The base 12 of the plant cover 10 also has an inner peripheral surface 24 which, when the plant cover 10 is opened, defines and encompasses an inner retaining space 26 as shown in FIGS. 1–5 which is suitable for retaining objects such as a pot or a floral grouping, as discussed in detail below. When the lower end 18 of the base 12 has a closed bottom a portion of the lower end 18 may be inwardly folded to form one or more gussets (not shown) for permitting a circular bottom of an object such as a floral grouping or a potted plant (FIGS. 1–2) to be disposed into the inner retaining space 26 of the lower end 18 of the base 12 of the plant cover 10.

The plant cover 10 is generally frusto-conically shaped, but the plant cover 10 may be, by way of example but not by way of limitation, cylindrical, frusto-conical, a combination of both frusto-conical and cylindrical, or any other shape, as long as the plant cover 10 functions as described herein as noted above. Further, the plant cover 10, or any portion or component thereof, may comprise any shape, whether geometric, non-geometric, asymmetrical and/or fanciful as long as it functions in accordance with the present invention. The plant cover 10 may also be equipped with drains or ventilation holes (not shown), or can be made from permeable or impermeable materials.

The material from which the plant cover 10 is constructed has a thickness in a range from about 0.1 mils to about 30 mils. Often, the thickness of the plant cover 10 is in a range from about 0.5 mils to about 10 mils. Preferably, the plant cover 10 has a thickness in a range from about 1.0 mil to about 5 mils. More preferably, the plant cover 10 is constructed from a material which is flexible, semi-rigid, rigid, or any combination thereof. The plant cover 10 may be constructed of a single layer of material or a plurality of layers of the same or different types of materials. Any thickness of the material may be utilized as long as the material functions in accordance with the present invention as described herein. The layers of material comprising the plant cover 10 may be connected together or laminated or may be separate layers. Such materials used to construct the plant cover 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the plant cover 10 may be formed as described herein, and as long as the formed plant cover 10 may contain at least a portion of a pot or potted plant 28 or a floral grouping 30, as described in further detail below. Additionally, an insulating material such as bubble film, preferable as one of two or more layers, can be utilized in order to provide additional protection for the item, such as the floral grouping 30, contained therein.

In one embodiment, the plant cover 10 may be constructed from two polypropylene films. The material comprising the plant cover 10 may be connected together or laminated or may be separate layers. In an alternative embodiment, the plant cover 10 may be constructed from only one of the polypropylene films.

The plant cover 10 may also be constructed, in whole or in part, from a cling material. "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a pot 32 or container. This connecting engagement is preferably temporary in that the material may be easily removed, i.e., the cling material "clings" to the pot.

The cling material is constructed and treated if necessary, from polyethylene such as Cling Wrap made by Glad®, First Brands Corporation, Danbury, Conn. The thickness of the cling material will, in part, depend upon the size of plant cover 10 and the size of the pot in the plant cover 10, i.e., generally, a larger pot may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The plant cover 10 is constructed from any suitable material that is capable of being formed into a plant cover and wrapped about a pot and a floral grouping 30 disposed therein. Preferably, the material comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the plant cover 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the upper and/or lower surface of the material comprising the plant cover 10. Moreover, portions of the material used in constructing the plant cover 10 may vary in the combination of such characteristics. The material utilized for the plant cover 10 itself may be opaque, translucent, transparent, or partially clear or tinted transparent.

It will generally be desired to use the plant cover 10 as a covering for a potted plant (FIG. 2). As shown in FIGS. 1–2, the potted plant 28 comprises a pot 32 having an upper end 34, a lower end 36, and an outer peripheral surface 38. An opening 40 intersects the upper end 34 forming an inner peripheral surface 42 which encompasses a retaining space 44 for retaining a floral grouping or plant 30. The lower end 36 of the pot 32 is closed but may have holes for permitting water drainage. The term "pot" as used herein refers to any type of container used for holding a floral grouping or plant 30. Examples of pots, used in accordance with the present invention include, but not by way of limitation, clay pots, wooden pots, plastic pots, pots made from natural and/or synthetic fibers, or any combination thereof. The pot 32 is adapted to receive a floral grouping 30 in the retaining space 44 (FIGS. 1–3). The floral grouping 30 may be disposed within the pot 32 along with a suitable growing medium 45 described in further detail below, or other retaining medium, such as a floral foam. It will also be understood that the floral grouping 30, and any appropriate growing medium 45 or other retaining medium, may be disposed in the plant cover 10 without a pot 32.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping 30 comprises a bloom or foliage portion 46 and a stem portion 48. Further, the floral grouping 30 may comprise a growing potted plant having a root portion (not shown) as well. However, it will be appreciated that the floral grouping 30 may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material may be disposed on a portion of the plant cover 10 to assist in holding the plant cover 10 to the pot 32 having the floral grouping 42 therein when such a pot 32 is disposed within the plant cover 10 or to assist in closing the upper end of the plant cover 10 or adhering the plant cover 10 to the pot 32 after the pot 32 has been disposed therein, as will be discussed in further detail below.

A bonding material may also be disposed on any surface of the base disposed on any surface of the base 12 or skirt, 14 defined herein, or both. The bonding material may act to connect the skirt 14 to the base 12 and/or the base 12 to the skirt 14 as well.

It will be understood that the bonding material may be disposed as a strip or block on a surface of the plant cover 10. The bonding material may also be disposed upon either the outer peripheral surface 20 or the inner peripheral surface 24 of the plant cover 10, as well as upon the pot 32. Further, the bonding material may be disposed as spots of bonding material, or in any other geometric, non-geometric, asymmetric, or fanciful form, and in any pattern including covering either the entire inner peripheral surface and/or outer peripheral surface of the plant cover 10 and/or the pot or pot cover. The bonding material may be covered by a cover or release strip which can be removed prior to the use of the plant cover, pot or pot cover. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material or bonding means" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material or bonding means" also includes materials which are heat sealable and, in this instance, the adjacent portions of the material must be brought into contact and then heat must be applied to effect the seal. The term "bonding material or bonding means" also includes materials which are sonic sealable and vibratory sealable. The term "bonding material or bonding means" when used herein also means a heat sealing lacquer or hot melt material which may be applied to the material and, in this instance, heat, sound waves, or vibrations, also must be applied to effect the sealing.

The term "bonding material or bonding means" when used herein also means any type of material or thing which can be used to effect the bonding or connecting of the two adjacent portions of the material or sheet of material to effect the connection or bonding described herein. The term "bonding material or bonding means" may also include ties, labels, bands, ribbons, strings, tapes (including single or double-sided adhesive tapes), staples or combinations thereof. Some of the bonding materials would secure the ends of the material while other bonding material may bind the circumference of a wrapper, or a plant cover, or, alternatively and/or in addition, the bonding materials would secure overlapping folds in the material and/or plant cover. Another way to secure the wrapping and/or plant cover is to heat seal the ends of the material to another portion of the material. One way to do this is to contact the ends with an iron of sufficient heat to heat seal the material.

Alternatively, a cold seal adhesive may be utilized as the bonding material or means. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material or bonding means" when used herein also means any heat or chemically shrinkable material, and static electrical or other electrical means, chemical welding means, magnetic means, mechanical or barb-type fastening means or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Certain versions of the plant cover 10 described herein may be used in conjunction with a preformed plant or flower pot cover or a manually formed plant or flower pot cover as explained in greater detail below.

Turning again to the plant cover 10 shown in FIGS. 1–5, the plant cover 10 comprises a unitary construction and has a base 12 and a skirt 14 and an expansion element 15 which extends about the base from the lower end 18 a distance upward but ends a distance from the upper end 16 of the base 12 and the skirt 14. The base 12 of the plant cover 10 is sized to substantially cover the outer peripheral surface 38 of a pot 32.

The plurality of expansion elements 15 (only one expansion element designated by the numeral 15) is integral to the base 12, and, alternatively, may be integral to the skirt 14 as well (not shown). The expansion element 15 functions to allow expansion at least a portion of the base 12 of the plant cover 10 to surround and encompass a pot 32, the base conforming substantially to the contour of the outer peripheral surface 38 of the pot 32. The skirt 14 of the plant cover 10 shown in FIGS. 1–5 is integrally formed at the upper end 16 of the base 12, and extends angularly from the base 12 as shown in FIGS. 1–3.

As shown in FIGS. 1–5, each expansion element 15 of the plant cover 10 comprises one or more areas of excess material shaped in the form of a pleat which extends generally from the lower end 18 to near the upper end 16 of the base 12. As used herein, the term "excess material" means an amount of material which has a greater surface area than would actually be necessary to form that portion of the plant cover 10 were that portion of the plant cover 10 actually flattened. The expansion element 15 can expand causing portions of the base 12 to expand outward and to conform to the outer peripheral surface 38 of a pot 32 when the plant cover 10 is disposed about a pot 32, as will be discussed in further detail below. In addition, the plurality of expansion elements 15 may alternatively be utilized in the skirt 14 instead of the base 12 and/or in a combination of the base 12 and skirt 14 (not shown). The skirt 14 may extend angularly away from the base 12, the skirt 14 extending away from the base 12 at any angle (for example, but not by way of limitation, horizontal, vertical, oblique) or any combination of angles, some angles being shown in FIGS. 1 and 2.

Further, the expansion element 15 may comprise an "in and out" plurality of accordion-shaped (also referred to herein as fluted or groove-shaped) expansion elements creating a pleating or gathering of the material forming at least a portion of the base 12 of the plant cover 10, as illustrated in a cross section of FIG. 3, shown in FIGS. 4 and 5, but it will be appreciated by one of ordinary skill in the art that the shapes of the expansion elements described above are but several of the shapes which can be contemplated for the present invention. Other patterns of pleating the material or gathering the material may, alternatively, be utilized (for instance, gussets, and fans, to name but a few examples), as long as the plant cover 10 is utilized in the manner shown and described herein.

Each of the plurality of expansion elements 15 may vary. That is, some expansion elements 15 may be more tightly or closely pleated than other expansion elements 15. Further, such a tightening or loosening of the pleating may vary in each individual expansion element 15, a portion of each expansion element 15 being loosely pleated while a portion of the expansion element a distance therefrom but contiguous therewith may be tightly or closely pleated (not shown).

Further, as described above, in alternative embodiments (not shown), different pleating patterns for the expansion elements 15 may be alternated together. Further, the pleating pattern may vary along the length of each individual expansion element 15 (not shown).

Referring now to FIGS. 3–5, FIG. 4 discloses a base 12 having a closed lower end 18, the lower end formed by placing a round sheet of material within the inner peripheral surface 24 of the base 12 and forming the round sheet of material in conjunction with the formation of the plurality of expansion elements in the base. The round sheet of material generally follows the contours of the plurality of expansion elements 15 in the base 12, but is also substantially flat on the bottom.

Similarly, FIG. 5 discloses a base having a closed lower end 18, the lower end formed by placing a square sheet of material within the inner peripheral surface 24 of the base 12 and forming the round sheet of material as described immediately above for FIG. 4.

Both the round sheet of material (FIG. 4) and the square sheet of material (FIG. 5) are connected to the base via a bonding material. It will be appreciated, however, that a closed lower end 18 may be formed in the base by other methods, including forming a unitary base 12 having a closed lower end 18 (not shown), by placing a material inside of the base or outside of the base, the material not following the contours of the plurality of expansion elements, or by any other method known in the art.

In a method of use, the base 12 is disposed over the outer peripheral surface 20 of a pot 32 either manually or, alternatively, mechanically, by preferably pulling the base 12d over the lower end 36 of the pot 32, the base 12 being disposed such that the inner peripheral surface 24 of the base 12 is adjacent to and in contacting engagement with the outer peripheral surface 38 and the contours thereof of the pot 32, the base 12 being disposed generally between the upper end 34 and the lower end 36 of the pot 32. The base 12 may have a bonding material disposed on the inner peripheral surface 24 thereof (not shown), or the pot 32 may have a bonding material disposed on the outer peripheral surface 38 thereof (not shown), or both the inner peripheral surface 24 of the base 12 and the outer peripheral surface 38 of the pot 32 may have a bonding material disposed thereon.

Figure 15:
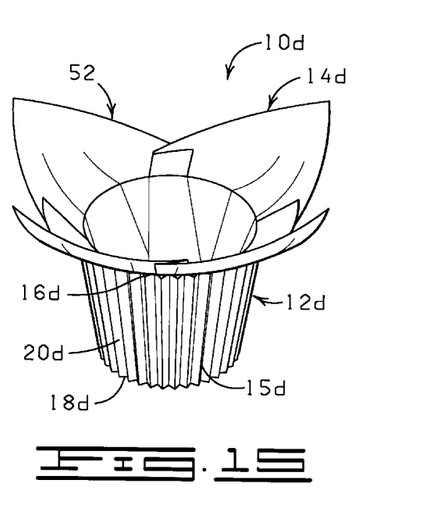
FIG. 15 is a perspective view of another embodiment of the present invention, the base shown in FIGS. 12 and 13 disposed about the flower pot cover shown in FIG. 14.

In an alternative method of use, a plant or floral grouping or plant 30 may be disposed directly into the base 12 of the plant cover 10, with an appropriate growing medium 45 or other medium, the floral grouping 30 being disposed through the opening 22 in the base 12 and into the inner retaining space 26 therein, the growing medium being adjacent at least a portion of the inner peripheral surface of the base 12, over 52, as shown in FIG. 15. In this instance, the base 12 will have sufficient rigidity (and will have a generally closed lower end 18) to adequately retain the floral grouping 30 within the plant cover 10.

The Embodiments and Methods of FIGS. 6 and 7

Shown in FIGS. 6 and 7 is a modified plant cover 10a which is constructed exactly like the plant cover 10 shown in FIGS. 1–5 and described in detail previously, except that each plant cover 10a has disposed circumferentailly about the outer peripheral surface 20a of the plant cover 10a a plurality of vertical strips having a plurality of expansion elements 15 followed by a vertically disposed smooth strip 50 (which has no expansion elements) in an alternating pattern.

It will be understood by one of ordinary skill in the art that any method of use described herein, or known in the art, may be utilized to place a pot, frequently having a floral grouping therein, or, an alternatively floral grouping, in the plant cover 10a.

Figures 9, 10, 11, 12, 13:
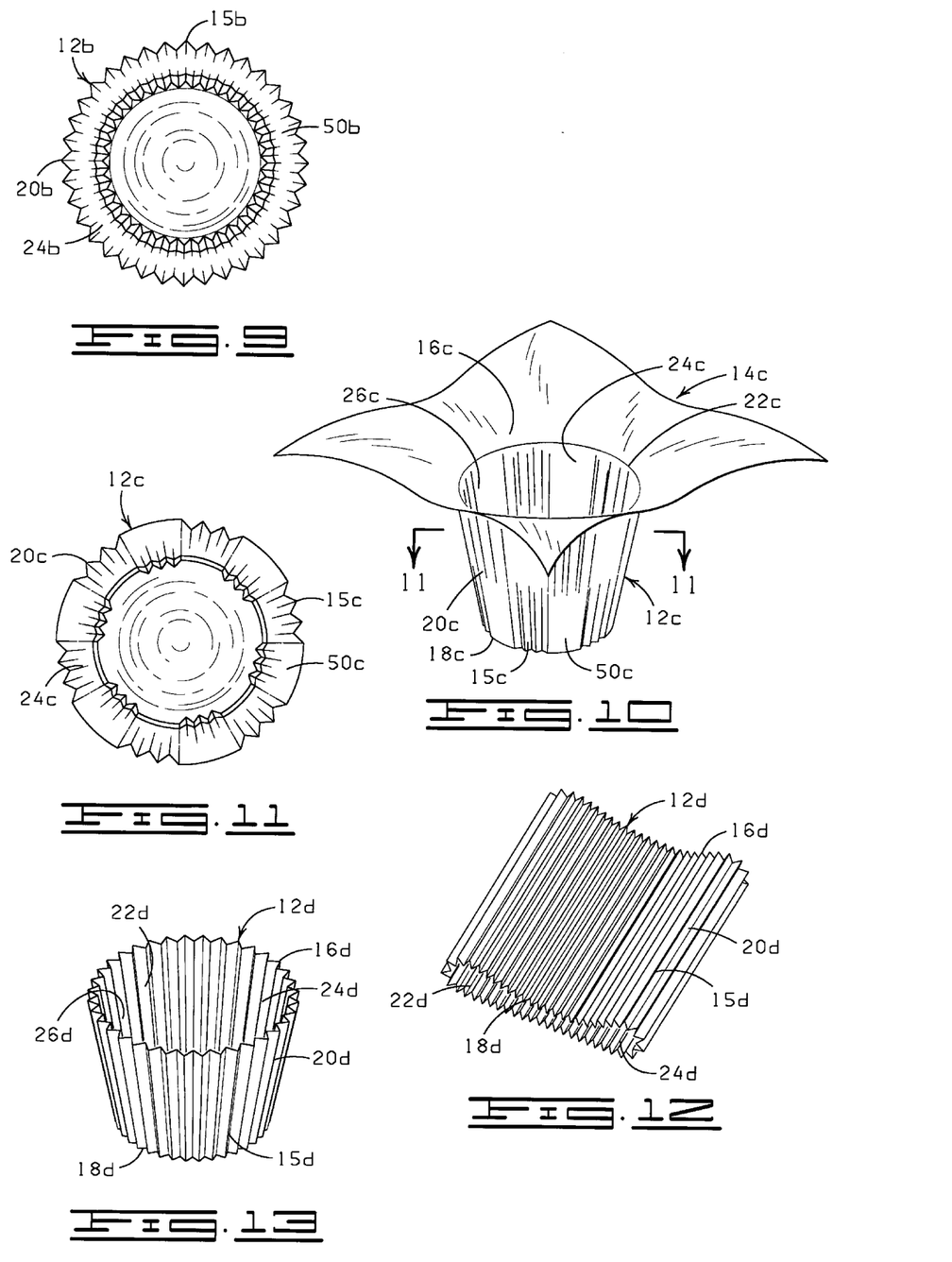
FIG. 9 is a plan view of a cross section through the plant cover of FIG. 8 showing the expansion element strips alternating with the smooth strips about the base of the plant cover.
FIG. 10 is a perspective view of a plant cover similar to the plant cover shown in FIG. 3, but having expansion element strips alternating with smooth strips in a "patch work" pattern which extends circumferentially about the base of the plant cover.
FIG. 11 is a plan view of a cross section through the plant cover of FIG. 10 showing the expansion element strips alternating with the smooth strips about the base of the plant cover.
FIG. 12 is a perspective view of the non-expanded base of the present invention, the base being shown as a separate component.
FIG. 13 is a perspective view of the base shown in FIG. 12, but showing the base in an extended configuration common when the base is disposed about a pot or container.
Figure 14:
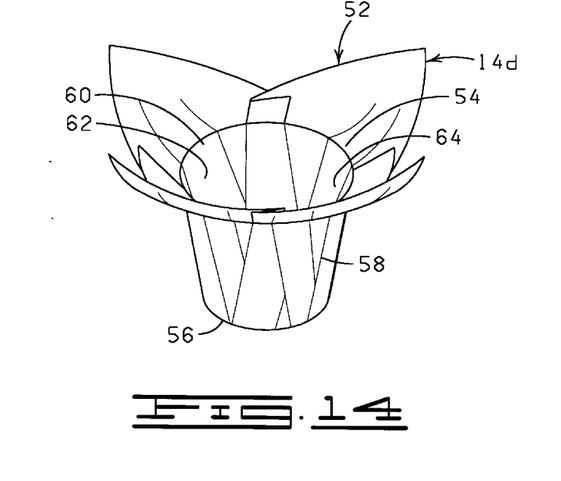
FIG. 14 is a perspective view of a flower pot cover, the flower pot cover being pre-formed.

The Embodiments and Methods of FIGS. 8 and 9

Shown in FIGS. 8 and 9 is a modified plant cover 10b which is constructed exactly like the plant cover 10 shown in FIGS. 1–5 and described in detail previously, except that each plant cover 10b has disposed circumferentailly about the outer peripheral surface 20a of the plant cover 10b a smooth strip 50b which extends horizontally and circumferentially about the plant cover 10b, thereby creating two separate circumferential strips of expansion elements 15b, one strip of expansion elements 15b disposed above the smooth strip 50b and a second strip of expansion elements 15bb disposed below the smooth strip 50b. It will be appreciated that a number of smooth strips 50b could be alternated with a number of strips of expansion elements 15b.

It will be understood by one of ordinary skill in the art that any method of use described herein, or known in the art, may be utilized to place a pot, frequently having a floral grouping therein, or, alteratively, only a floral grouping, in the plant cover 10a.

The Embodiments and Methods of FIGS. 10 and 11

Shown in FIGS. 10 and 11 is a modified plant cover 10c which is constructed exactly like the plant cover 10 shown in FIGS. 1–5 and described in detail previously, except that each plant cover 10c has a plurality of rectangular "patches" of expansion elements 15c which alternate, in a patch-work pattern, with a plurality of smooth strips 50c. Both the plurality of expansion elements 15c and the smooth strips 50c are disposed circumferentailly about the outer peripheral surface 20a of the plant cover 10a. It will be appreciated by one having ordinary skill in the art that additional patterns, using both a plurality of expansion elements 15c and a plurality of smooth strips 50b may be created.

It will further be understood by one of ordinary skill in the art that any method of use described herein, or known in the art, may be utilized to place a pot, frequently having a floral grouping therein, or alternatively, only a floral grouping, in the plant cover 10a.

The Embodiments and Methods of FIGS. 12–15

Shown in FIGS. 12–15 is a modified plant cover 10d. The modified plant cover 10d comprises a base 12d which is constructed exactly like the base 12 shown in FIGS. 1–5 and described in detail previously, but the base is formed as a separate component, as shown in FIG. 12 (in the present instance, without a closed lower end 18d), and the base 12d is shown in its unexpanded shape, the base 12d contracted somewhat in its unexpanded shape. In its expanded shape, shown in FIG. 13 (such an expanded shape being created when the base 12d is pulled over a generally frusto-conical pot or container, which is not illustrated), the base 12d is substantially similar to the base 12 of the plant cover 10 shown in FIGS. 1–5 and described in detail previously (except for the differences described above). In this embodiment, the base 12d and a flower pot cover 52 having a skirt 14d form the plant cover 10d.

A flower pot cover 52 having a skirt 14d is utilized along with the base 12d. Preferably, the flower pot cover is a preformed flower pot cover. Such a flower pot cover is illustrated and described in U.S. Pat. No. 4,773,182, issued Sep. 27, 1988, entitled "Article Forming System," which is hereby incorporated by reference herein.

The flower pot cover 52 comprises an upper end 54, a closed lower end 56 (the lower end 56 illustrated as closed, but which may be closed, or partially open due to apertures in the lower end, or completely open) and an outer peripheral surface 58. The upper end 54 is intersected by an opening 60, which forms an inner peripheral surface 62, the inner peripheral surface 62 defining an inner retaining space 64. The flower pot cover 52 has a skirt 14d which is formed at the upper end 54 of the pot cover 52 and which is an integral part of the flower pot cover 52. The skirt 14d is constructed exactly like the skirt 14 shown in FIGS. 1–5 and described in detail previously, except that the skirt 14d is formed as an integral part of the flower pot cover 52. It will be understood, however, that the flower pot cover 52 may alternatively comprise a flower pot cover 52 having a skirt attached thereto, the skirt being formed as a separate component (not shown), or a flower pot cover 52 without a skirt (not shown).

The base 12d is disposed over the outer peripheral surface 58 of the flower pot cover 52 manually or, alternatively, mechanically, by preferably pulling the base 12d over the lower end 56 of the flower pot cover 52, the base 12d being disposed such that the inner peripheral surface 24d of the base 12d is adjacent to and in contacting engagement with the outer peripheral surface 58 of the flower pot cover 52, the base 12d being disposed generally between the upper end 54 and the lower end 56 of the flower pot cover 52. Alteratively, the base may be disposed such that the upper end 16d of the base extends above the upper end 54 of the pot cover 52d, the lower end 18d of the base 12d also capable of being disposed lower than the lower end 56 of the pot cover 52. The base 12d may have a bonding material disposed on the inner peripheral surface 24d thereof (not shown), or the flower pot cover 52 may have a bonding material disposed on the outer peripheral surface 58 thereof (not shown), or both the inner peripheral surface 24d of the base 12d and the outer peripheral surface 58 of the pot cover 52 may have a bonding material disposed thereon, to permit a connection therebetween.

The flower pot cover 52 may have sufficient strength and rigidity to permit the base 12d via the plurality of expansion elements 15d thereon, to snugly fit about the outer peripheral surface 58 of the flower pot cover 52, as shown in FIG. 15. In this instance, a floral grouping 30 or potted plant 28 (having a growing medium 45 or other medium) may be disposed directly into the flower pot cover 52. Alteratively, however, the flower pot cover 52 may be formed from a non-shape sustaining material, and therefore a pot 32 (with or without a floral grouping 32 or a potted plant 28 with growing medium 45 or other medium) will be disposed first in the flower pot cover 52, then the base 12d is disposed about the flower pot cover 52 as described above.

The base 12d may be utilized as a band about the flower pot cover 52 (the pot cover 52 being either a pre-formed pot cover or a sheet wrapped about a pot). One particular method of securing a pot cover 52 about a pot 32 (or a floral grouping 30 or potted plant 28) is by applying a band about the pot 32 to hold the covering in place such as is described in U.S. Pat. No. 5,105,599 entitled "Means For Securing A Decorative Cover About A Flower Pot" issued to Weder on Apr. 21, 1992 and which is hereby incorporated herein by reference.

Figure 16:
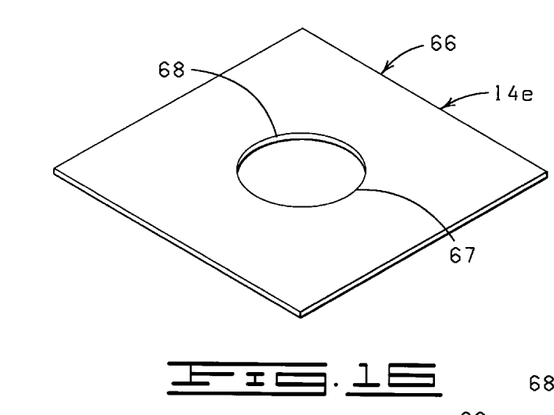
FIG. 16 is a perspective view of a skirt formed as a separate element, the skirt having an aperture therein.
Figure 17:
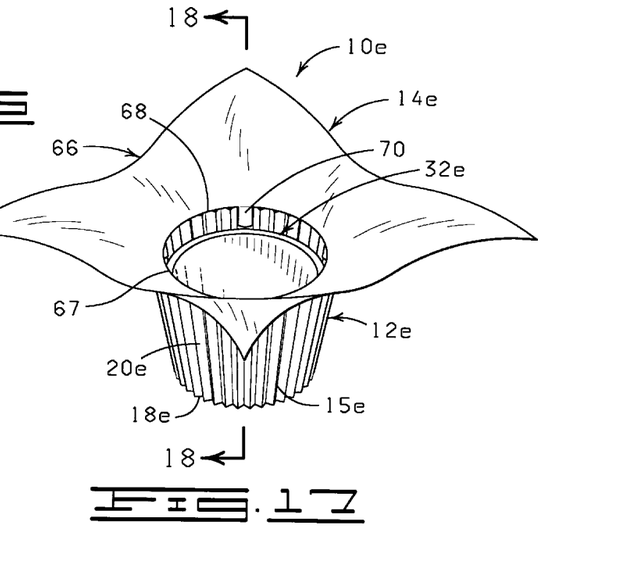
FIG. 17 is a perspective view of the both the skirt and base as separate elements connected together, the skirt connecting to the inner peripheral surface of the base near the upper end of the base via tabs.
Figure 18:
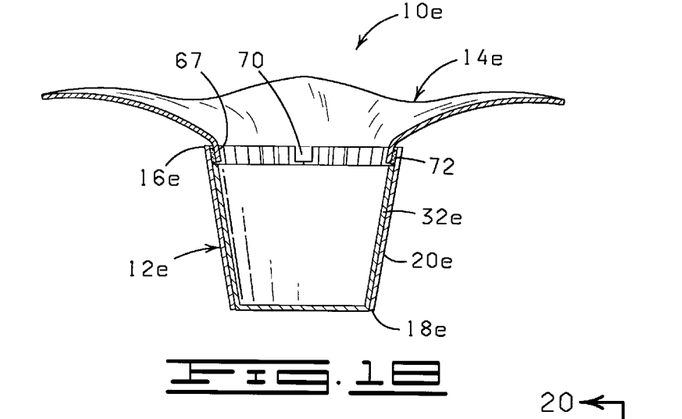
FIG. 18 is a transverse view of the plant cover of FIG. 17, showing the connection of the tabs of the skirt to the inner peripheral surface of the base via bonding material.

The Embodiments and Methods of FIGS. 16–18

Shown in FIGS. 16–18 is a modified plant cover 10e. The modified plant cover 10e comprises a base 12e which is constructed exactly like the base 12 shown in FIGS. 1–5 and described in detail previously, except that the base 12e is formed as a separate component, as shown in both FIGS. 17 and 18, (in this instance, shown without a closed lower end, similar to the lower end 18 shown in FIGS. 12 and 13), and the base 12e is shown without a skirt 14e. The modified plant cover 10e also comprises a skirt 14e which is constructed exactly like the skirt 14 shown in FIGS. 1–5 and described in detail previously, except that the skirt 14e is formed as a separate component, as shown in FIG. 16. The skirt 14e comprises a square sheet of material 66 (although any geometric, non-geometric, asymmetric or fanciful shape of skirt may be utilized). The skirt 14e comprises an aperture 68 in the center of the sheet of material 66, to accommodate a pot 32e and/or the base 12e of the plant cover 10e. A round portion 67 of the sheet of material 66 surrounds the aperture 68.

The skirt 14e further comprises a plurality of tabs 70 (only one tab designated by the numeral 70). Each of the plurality of tabs 70 has a bonding material 72 disposed thereon. The bonding material is disposed in such a manner that the each of the plurality of tabs 70 acts to connect the skirt 14e to the inner peripheral surface 24 of the base 12e. That is, each tab 70 connects to a portion of the inner peripheral surface 24e of the base 12e, generally near the upper end 16e thereof, as shown in FIGS. 17 and 18. In this embodiment, a portion of the skirt 14e connects to a portion of the upper end 16e of the base 12e, the round portion 67 of the skirt 14e connecting to the inner peripheral surface 24e of the base 12e, as shown in FIG. 18. It will be appreciated that a portion of the skirt 14e near the round portion 67 may have a bonding material disposed thereon (not shown), which would act to connect the skirt 14e to the base 12e. This alternative embodiment may have utilize a plurality of tabs 70, or may be used without tabs 70. Further, at least a portion of the inner peripheral surface 24e of the base 12e may also be provided with a bonding material near the upper end 16e of the base 12e (not shown) in order to connect the skirt 14e to the base 12e as described above. And, in a further alternative, both the skirt 14e and the base 12e may be provided with a bonding material to form a connection therebetween, as described above.

It will further be understood by one of ordinary skill in the art that any method of use described herein, or known in the art, may be utilized to place a pot, frequently having a floral grouping therein, or, alternatively, a floral grouping alone, in the plant cover 10e.

Figure 19:
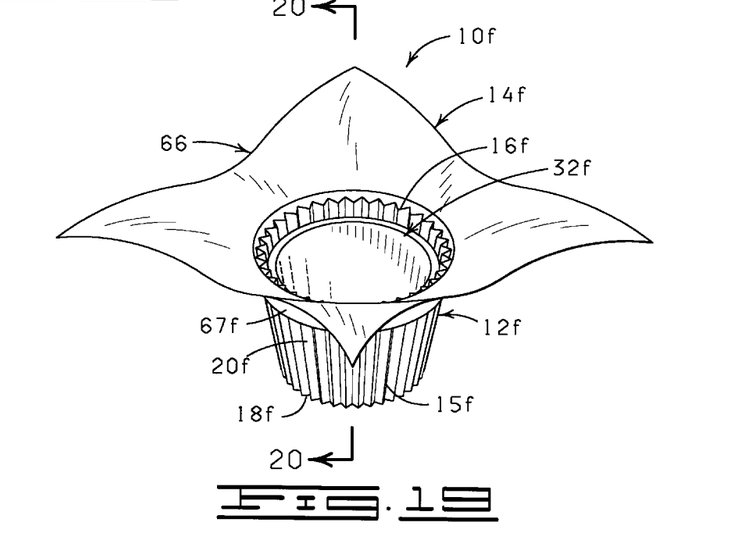
FIG. 19 is a perspective view of the both the skirt and base as separate elements connected together, the skirt connecting to the outer peripheral surface of the base near the upper end of the base.
Figure 20:
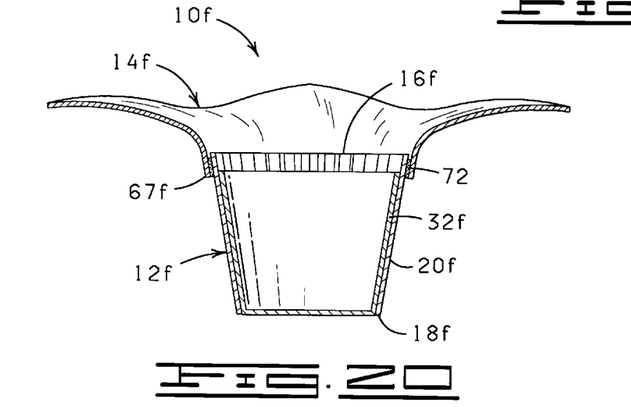
FIG. 20 is a transverse view of the plant cover of FIG. 19, showing the connection of the skirt to the outer peripheral surface of the base via bonding material.

The Embodiments and Methods of FIGS. 19 and 20

Shown in FIGS. 19 and 20 is a modified plant cover 10f. The modified plant cover 10f comprises a base 12f which is constructed exactly like the base 12e shown in FIGS. 16–18 and described in detail previously. The modified plant cover 10f also comprises a skirt 14f which is constructed exactly like the skirt 14e shown in FIGS. 16–18 and described in detail previously, except that the skirt 14f is formed without a plurality of tabs.

In this embodiment, a portion of the skirt 14f connects to a portion of the upper end 16f of the base 12f, the round portion 67f of the skirt 14f connecting to the outer peripheral surface 20f of the base 12f, as shown in both FIGS. 19 and 20. It will be appreciated that a portion of the skirt 14f near the round portion 67f may have a bonding material 72 disposed thereon (FIG. 20) which acts to connect the skirt 14f to the base 12f. This alternative embodiment may also utilize a plurality of tabs 70 which connect to the outer peripheral surface 20f of the base 12f (not shown). Further, at least a portion of the outer peripheral surface 20f of the base 12f may also be provided with a bonding material near the upper end 16f of the base 12f (not shown) in order to connect the skirt 14f to the base 12f as described above. And, in a further alternative, both the skirt 14f and the base 12f may be provided with a bonding material 72 to form a connection therebetween, as described previously.

It will further be understood by one of ordinary skill in the art that any method of use described herein, or known in the art, may be utilized to place a pot, frequently having a floral grouping therein, or, alternatively, only a floral grouping, in the plant cover 10e.

It will be appreciated by one of ordinary skill in the art that portions of the embodiments shown and described herein may be used with other portions of the embodiments to create additional combinations of components for the plant cover 10 disclosed herein.

Changes may be made in the construction and the operation of the various components, elements and assemblies described herein or in the steps or the sequence of steps of the methods described herein without departing from the spirit and scope of the invention as defined in the following claims.

What is claimed is:

1. A method of using a flower pot cover, comprising the steps of:

providing a pot having an outer peripheral surface, the pot having a floral grouping therein;

providing a flower pot cover, comprising
- a base formed from a sheet of material, said base having an upper end, a lower end, and an outer peripheral surface, an opening intersecting the upper end forming an inner peripheral surface and a retaining space;
- a skirt, said skirt connected to the upper end of the base;
- wherein said flower pot cover has at least one expansion means portion, the expansion means portion comprising accordion pleating comprising an excess of the sheet of material,
- wherein said flower pot cover comprises both the expansion means portion and a smooth unpleated portion,
- wherein the expansion means portion permits the base to expand and contract to both closely encompass and follow the contours of the outer peripheral surface of the pot,
- expanding the expansion means portion of the flower pot cover such that the flower pot cover has an inner peripheral surface wider than the outer peripheral surface of the pot;
- disposing the flower pot cover about the pot by disposing the inner peripheral surface of the base adjacent the outer peripheral surface of the pot;
- releasing the expansion means portion thereby permitting the expansion means portion to contract and substantially encompass the pot, the base of the flower pot cover closely following the contours of the outer peripheral surface of the pot; and
- positioning the skirt such that the skirt extends a distance away from the pot.

2. The method of claim 1 wherein in the step of proving a flower pot cover, the base is further defined as constructed from a sheet of material selected from the group consisting of a paper, cellophane, foil, polymer film, fabric, burlap and combinations thereof.

3. The method of claim 1 wherein in the step of providing a flower pot cover, the skirt is further defined as being constructed from a sheet of material selected from the group consisting of a papers cellophane, foil, polymer film, fabric, burlap and combinations thereof.

4. The method of claim 1 wherein in the step of providing a flower pot cover, both the base and the skirt are defined further as being constructed from a sheet of material comprising a polymer film.

5. The method of claim 1 wherein in the step of providing a flower pot cover, both the base and the skirt are defined further as having a thickness in a range of less than about 0.1 mils to about 30 mils.

6. The method of claim 1 wherein in the step of providing a flower pot cover, both the base and the skirt are defined further as having a thickness in a range of less than about 0.2 mils to about 10 mils.

7. The method of claim 1 wherein in the step of providing a flower pot cover, both the base and the skirt are defined further as having a thickness in a range of less than about 0.5 mils to about 5 mils.

8. The method of claim 1 wherein in the step of providing a flower pot cover, the flower pot cover further comprises a bonding material.

* * * * *

UNITED STATES PATENT AND TRADEMARK OFFICE
CERTIFICATE OF CORRECTION

PATENT NO. : 5,865,011 Page 1 of 1
DATED : February 2, 1999
INVENTOR(S) : Donald E. Weder It is certified that error appears in the above-identified patent and that said Letters Patent is hereby corrected as shown below:

Column 6,
Lines 34 and 41, FIG. 17, after word "of" and before word "both" delete word "the".

Column 13,
Line 45, "20a" should be -- 20b --.
Line 60, "10a" should be -- 10b --.

Column 14,
Line 34, after word "cover" and before word "is" add number -- 52 --.

Column 18,
Line 1, word "proving" should be -- providing --.

Signed and Sealed this

Twenty-seventh Day of January, 2004

JON W. DUDAS
*Acting Director of the United States Patent and Trademark Office*